(12) United States Patent
Cariffe

(10) Patent No.: US 6,933,840 B2
(45) Date of Patent: Aug. 23, 2005

(54) SYSTEM AND METHOD FOR CONFIGURING A PRINTING DEVICE FOR A PHYSICAL ENVIRONMENT

(75) Inventor: Alan E. Cariffe, San Diego, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 497 days.

(21) Appl. No.: 10/066,225

(22) Filed: Jan. 29, 2002

(65) Prior Publication Data
US 2003/0145070 A1 Jul. 31, 2003

(51) Int. Cl.[7] .............................................. G08B 23/00
(52) U.S. Cl. ................... 340/500; 340/531; 455/556.1; 455/556.2
(58) Field of Search ................................ 340/500, 531; 455/90, 557, 556.1, 556.2; 342/118

(56) References Cited

U.S. PATENT DOCUMENTS

| | | | |
|---|---|---|---|
| 4,882,724 A | 11/1989 | Vela et al. | |
| 5,508,699 A | 4/1996 | Silverman | |
| 5,539,395 A | 7/1996 | Buss et al. | |
| 5,630,068 A | 5/1997 | Vela et al. | |
| 5,790,074 A | 8/1998 | Rangedahl et al. | |
| 5,835,061 A | 11/1998 | Stewart | |
| 5,950,125 A | 9/1999 | Buhrmann et al. | |
| 5,969,678 A | 10/1999 | Stewart | |
| 5,973,618 A | 10/1999 | Ellis | |
| 6,049,755 A | 4/2000 | Lou et al. | |
| 6,078,826 A | * 6/2000 | Croft et al. | ................. 455/574 |
| 6,091,956 A | 7/2000 | Hollenberg | |
| 6,160,493 A | 12/2000 | Smith | |
| 6,177,905 B1 | 1/2001 | Welch | |
| 6,199,045 B1 | 3/2001 | Giniger et al. | |
| 6,256,503 B1 | 7/2001 | Stephens | |
| 6,259,405 B1 | 7/2001 | Stewart et al. | |
| 6,259,990 B1 | 7/2001 | Shojima et al. | |

* cited by examiner

Primary Examiner—Julie Bichngoc Lieu

(57) ABSTRACT

A printing device is provided, such printing device including a controller configured to determine whether a position of the printing device is within a first physical environment, and upon such determination, to adjust to a mode of operation useful in interacting with a source device associated with the first physical environment. The printing device may further include a communication interface configured to establish a communication link between the printing device and the source device, and to interact with the source device via the communication link utilizing the adjusted mode of operation.

24 Claims, 3 Drawing Sheets

SYSTEM AND METHOD FOR CONFIGURING A PRINTING DEVICE FOR A PHYSICAL ENVIRONMENT

BACKGROUND OF THE INVENTION

Recently, printing devices have been developed that are compact in size and easily transportable by a user from one location to another. These printing devices are often pre-configured by a user to operate with the user's computing device, typically a laptop computer or personal digital assistant (PDA). The user may easily bring these computing and printing devices to, for example, a business meeting in a conference room down the hall, or across the country. At the meeting, the user may conveniently use the printing device, for example, to print out a hard copy of a document stored on the user's computing device for other meeting attendees.

However, current printing devices suffer from the drawback that they may be unable to print documents from unfamiliar devices and networks, without complicated configuration of both the printing device and the unfamiliar device and network. A user may desire, for example, to use the printing device he/she brought to the meeting to print a document stored on one of the other meeting attendee's computing devices, a slide show stored on a projector device in the meeting room, or a document stored on a device connected to a local area network that services the meeting room. Unfortunately, current printing devices typically must be reconfigured by the user each time the user desires to connect the printing device to a new device, to a new network, or to a new location within a network. Thus, a user whose printing device has been configured to print documents from the user's laptop computer may have to inconveniently reconfigure the printing device in order to print a slide from a projector in a meeting room.

Using current printing technologies, the reconfiguration process may be complicated and time consuming. For example, if the user desires to print a slide from a projector connected to a wireless LAN in a meeting room, the user must configure the printing device to recognize the wireless LAN and projector, as well as configure the wireless LAN and projector to recognize the printing device. This may require that the user understand how to program the computing device, as well as how to program the network and/or interface to projector.

The user also may have to install specialized print driver software on, for example, the projector to enable it to send print jobs to the printing device. Manuals and software for this process may be difficult or impossible to locate. Even if such materials are available, the user may lack sufficient technical ability to complete the task, and may have to locate a system administrator, if available.

As a result, significant meeting time may be wasted while the user attempts the manual reconfiguration process. If too much time is wasted, the user may abandon the task entirely.

SUMMARY OF THE INVENTION

A printing device is provided, such printing device including a controller configured to determine whether a position of the printing device is within a first physical environment, and upon such determination, to adjust to a mode of operation useful in interacting with a source device associated with the first physical environment. The printing device may further include a communication interface configured to establish a communication link between the printing device and the source device, and to interact with the source device via the communication link utilizing the adjusted mode of operation.

The method for configuring the printing device may include detecting whether a printing device is within a first physical environment, wherein the first physical environment has an associated source device, adjusting the printing device to a mode of operation that is useful for interaction with the source device, and establishing a communication link between the printing device and the source device.

DETAILED DESCRIPTION OF THE INVENTION

Figure 1:
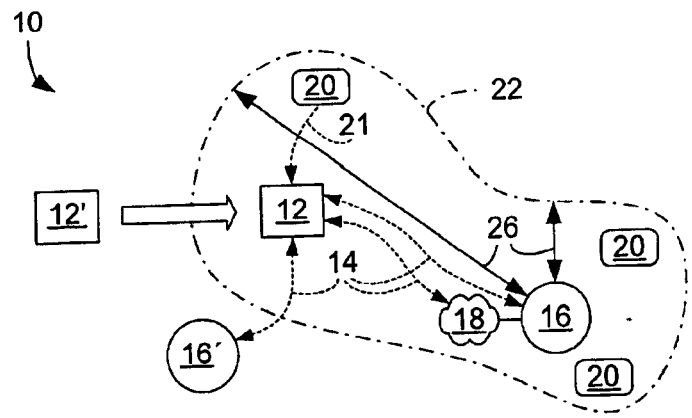
FIG. 1 is a schematic view of a printing system for use in printing a document from a source device to a printing device, according to one embodiment of the present invention.

Referring initially to FIG. 1, a printing system according to one embodiment of the present invention is shown generally at 10. Printing system 10 typically includes a printing device 12 that may be moved from a position, shown at 12', that is outside a physical environment 22 to a position, shown at 12, within the physical environment. As device 12 is moved, the device may be configured to determine that the device is positioned within the physical environment 22, and adjust itself to a mode of operation that is useful in interacting with a source device 16 associated with the physical environment. Printing device 12 is further configured to establish a communication link 14 with source device 16, and to communicate with the source device over communication link 14, according to the adjusted mode of operation. By way of example, the physical environment may be a meeting room, and the source device may be a laptop computing device. The present invention, however, is not so limited.

Typically, source device 16 is positioned within physical environment 22, and the physical environment is defined by a threshold physical proximity 26, extending from the source device to a boundary of the physical environment. Alternatively, the source device may be positioned outside of the physical environment, as shown at 16'. As shown, threshold physical proximity 26 may vary with direction from the device, as shown.

Printing device 12 may be configured to determine whether it is within physical environment 22 by detecting the establishment of communication link 14 with source device 16, either via a network 18 or directly. In this embodiment, the range of communication link 14 usually establishes the boundary of physical environment 22, and also threshold physical proximity 26.

Alternatively, system 10 may include position beacons 20 that transmit position signals 21 to the printing device.

Position beacons 20 may be virtually any type of beacon configured to emit position signals, including but not limited to an optical beacon emitting infrared or other light, a radio frequency or other high frequency beacon, or a global positioning satellite beacon. Typically optical beacons are placed within the physical environment 22, within a line of sight of printing device 12. Radio frequency beacons may be placed either within the physical environment 22, or within the beacon's broadcast range of the environment. Global positioning satellite positioning beacons orbit the Earth.

Figure 3:
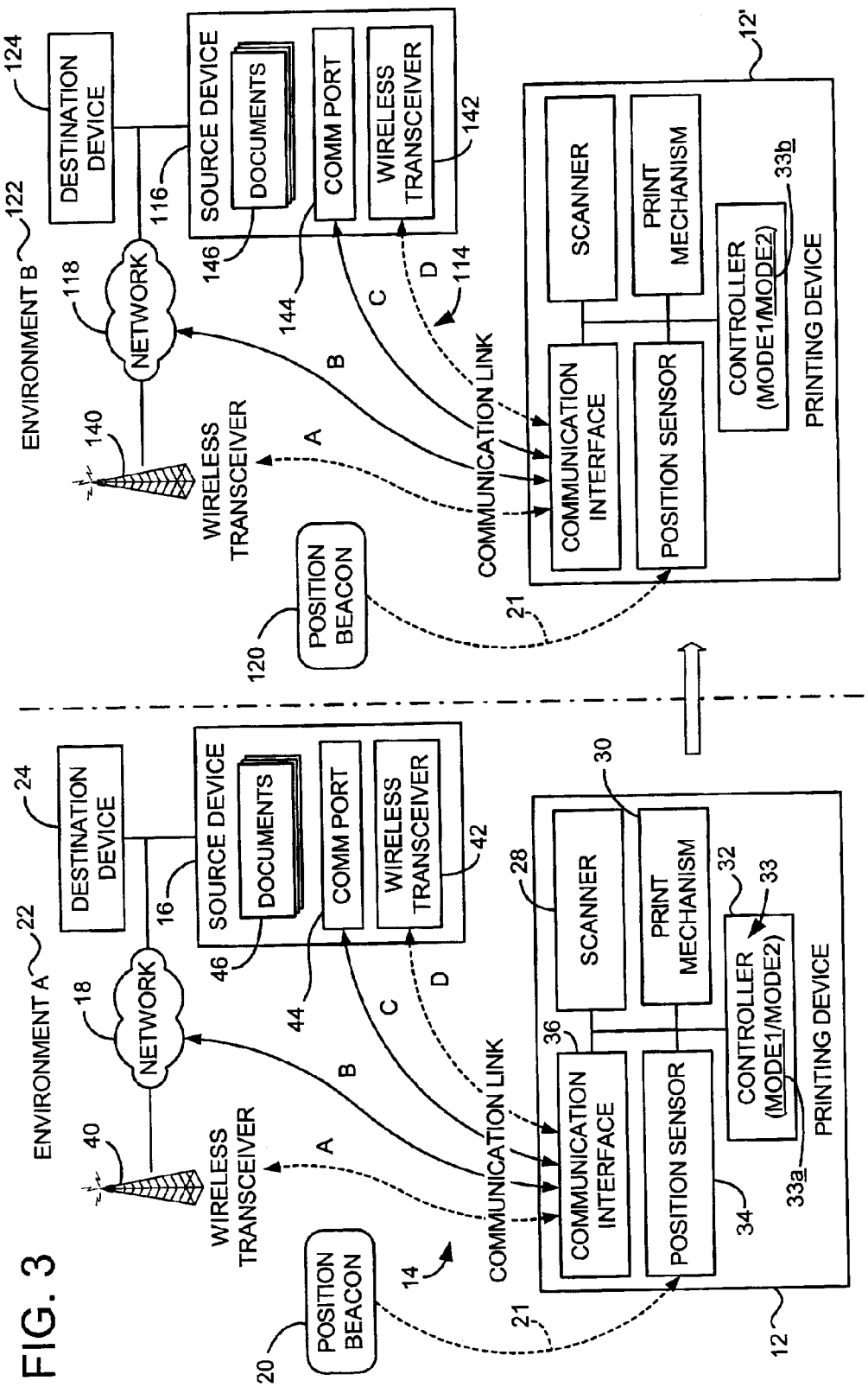
FIG. 3 is a schematic view of the system of FIG. 1, showing the movement of a printing device between two different exemplary physical environments.

The printing device may be configured to receive these position signals 21 via a position sensor 34, shown in FIG. 3, which may be an optical sensor, radio or other high frequency receiver, or GPS receiver. From these signals, the position sensor may be configured to determine whether printing device 12 is within physical environment 22.

It will also be appreciated that printing device 12 may be configured to transmit positional information about itself to the network. Again, mere establishment of a communication link may provide such positional information. This information may be used by the network and/or source device 16 to determine the proper print jobs, fax jobs, or other data to transfer to the printing device.

Figure 2:
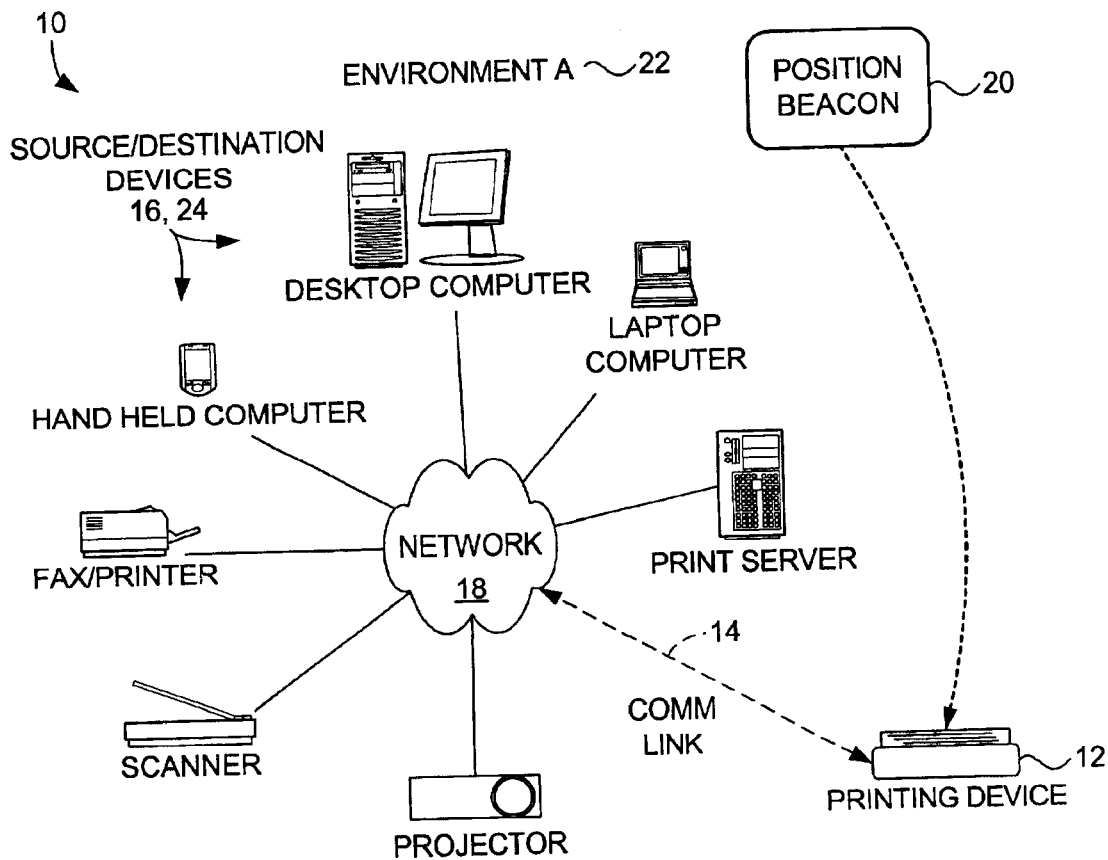
FIG. 2 is a schematic view of the system of FIG. 1, showing various types of source devices.

Turning now to FIG. 2, source device 16 may be virtually any type of computing device, such as a desktop computing device, laptop computing device, hand-held computing device, print server or other computing device suitable for storing printable documents 46, shown in FIG. 3. In addition, source device 16 may be a computing peripheral, including but not limited to a printer, facsimile machine, scanner, or projector, which is configured to store, at least temporarily in a buffer or other memory, printable documents 46. As used herein the term "documents" shall include any printable data in electronic form, and is meant to encompass print jobs, scan jobs, facsimile data, slides, and other printable data containing text, graphics, and/or images.

Any of the source devices 16 may also be a destination device 24 for data sent from printing device 12. For example, according to certain embodiments of the invention, printing device 12 may also be equipped with user input device such as a scanner, shown at 28 in FIG. 3. Printing device 12 thus may be configured to scan documents and send the scan data to a selected destination device 24, such as a printer. It thus will be appreciated that the printing device may take the form of a multi-function device capable of printing, copying, scanning, etc.

Turning now to FIG. 3, printing device 12 may include a scanner 28, as discussed above. Scanner 28 may be configured to scan a hard copy of a document and save the results as scan data. The scanner may optionally include a facsimile mode, in which the user may scan a document and instruct the controller to fax the document to a destination facsimile number. Similarly, the scanner may include a copy mode, in which the user may scan a document and instruct the controller to produce a copy or the perform some other function on the scanned document.

Printing device 12 also typically includes a print mechanism 30 configured to print documents 46 on paper, acetate, or other print medium. The print mechanism may operate using inkjet, laser, thermal, or other printing technologies that are well-known in the art.

Printing device 14 also typically includes a controller 32 configured to control the operation of scanner 28, print mechanism 30, and the other components of the printing device. Controller 32 typically has a plurality of modes of operation. While in environment A, shown at 22, the controller may operate in a first mode (MODE 1) of operation 33a, and when moved to be positioned at 12' in a environment B, the controller may operate in a second mode (MODE 2) of operation 33b. First mode of operation 33a is useful in enabling printing device 12 to interact with source device 16 of environment A, while second mode of operation 33b is useful in enabling printing device 12 to interact with source device 116 of environment B.

Printing device 12 may include a position sensor 34 configured to receive position signals 21 from position beacon 20, as described above. Position sensor 34 may be configured to receive optical position signals, radio frequency position signals, GPS position signals, or any of a wide variety of other position signal types.

Printing device 12 also may include a communication interface 36 configured to establish a communication link 14 with source device 16. Communication interface 36 may be a wireless communication interface such as a optical interface, wireless modem, radio frequency interface, or other wireless interface. Alternatively, communication interface 36 may be a "direct" or "hardwired" interface to network 18 or source device 16.

Thus, it will be appreciated that communication link 14 may be established in a wide variety of manners, including (A) via a wireless link to network 18 through wireless network transceiver 40, (B) via a wired link to network 18, (C) via a wired link to source device 16 through communications port 44, or (D) via a wireless link to the source device 16 through wireless transceiver 42.

As the printing device is moved into environment B to the position shown at 12', the controller may be configured to determine that a position of the printing device is within physical environment 122. Typically, the determination may be made by detecting the establishment of a communication link 114 with source device 116 or network 118. Alternatively, the determination may be made based upon position signals 121 from position sensors 120, as described above.

Upon determining that printing device is within physical environment 122, the computing device is configured to adjust to a mode of operation 33b that is useful in interacting with source device 116 associated with the physical environment 122. In addition, the communication interface of the printing device may be configured to establish a communication link 114 between the printing device and source device 116, and to interact with the source device via the communication link utilizing the adjusted mode of operation 33b. In some instances, establishment of the link itself may indicate that the printing device is within physical environment 122. In other instances, a communication link is established after determining that the printing device is within physical environment 122. The communication link may be wireless via wireless transceiver 140 or 142, or wired via communications port 142 or network 118, as discussed above. The communication link may be used to print documents 146 from source device 116 on the printing device positioned with environment 122, according to mode of operation 33b.

According to one embodiment of the invention, the communication interface may be configured to initiate establishing the communication link prior to the controller adjusting the mode of operation. In this embodiment, the controller may be configured to determine whether a position of the printing device is within the physical environment at least in part by detecting the establishment of the communication link with a source device within the physical environment, as discussed briefly above.

Controller 32 may be configured to adjust the mode of operation of the printing device by configuring the printing device to receive print jobs from the source device. For example, the printing device may be configured to receive print jobs from a projector in a lecture hall, from a laptop in a meeting room, from a scanner in a library, from a PDA owned by a friend, or from a print server on a network.

The controller also may be configured to adjust the mode of operation of the printing device by configuring the printing device to interact with the network. This may involve announcing the presence of the printing device on the network, and making the printing device available to receive print jobs from a print server or other source devices on the network. This may also involve installing the printing device as a printer on a source device. In addition, this may involve installing a suitable print driver on the source device to enable the source device to output print jobs in a language recognizable by the printing device. The suitable print driver may be downloaded to the source device from the printing device, or from some other location on the network.

Further, the controller may also be configured to adjust the mode of operation of the printing device by configuring the printing device to send data to a destination device, such as a destination printer on the network. This may involve installing the destination printer as a printer on the printing device, as well as installing a suitable print driver for the destination printer on the printing device. For example, the controller may adjust the mode of the printing device to sending scan data from onboard scanner 28 to a printer on the network. In addition, it will be appreciated that the printing device may be configured to receive scan data from a source device including a scanner, and print the scan data via print mechanism 30.

In addition, the controller may be configured to send facsimile data to an appropriate source device configured to forward the facsimile data to a destination facsimile telephone number. By doing so, the printing device may be configured to send and/or receive faxes to and from an outside destination via the source device.

The controller also may be configured to adjust to the mode of operation by downloading program components useful in communication with the source device, such as the above-described print drivers or other software components useful in printing print jobs on the printing device.

Figure 4:
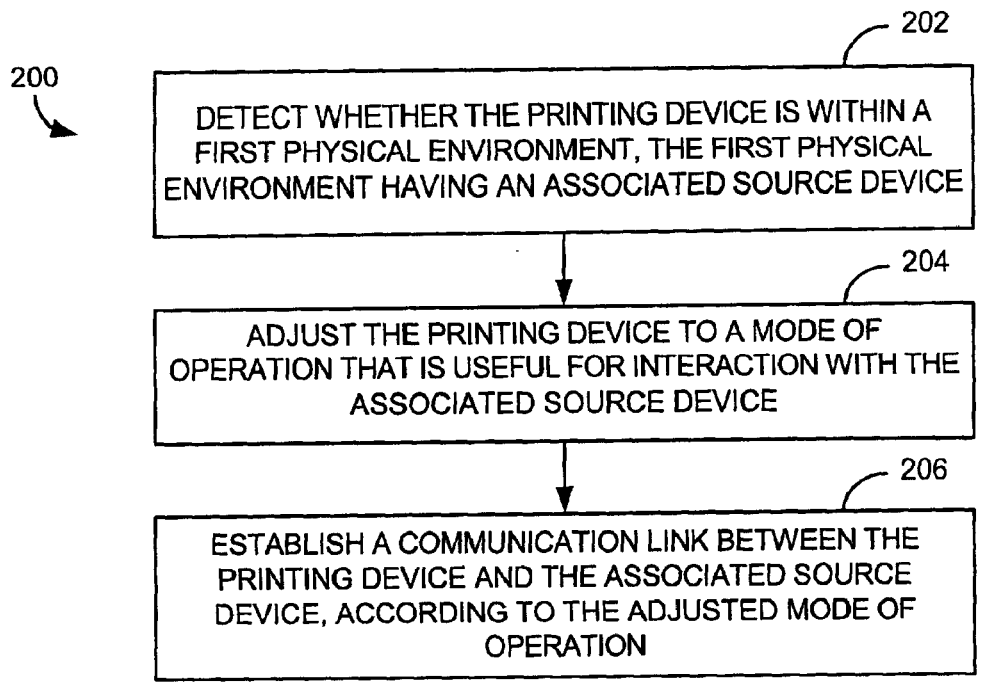
FIG. 4 is a flowchart of a method for use in configuring a printing device, according to one embodiment of the present invention.

Turning now to FIG. 4, a method for use in configuring a printing device according to one embodiment of the present invention is shown generally at 200. Method 200 typically includes, at 202, detecting whether the printing device is within a first physical environment. The step of detecting, for example, may include reading a radio frequency signal, optical signal, global positioning satellite signal, or other position signal from a position beacon. Typically, the first physical environment has an associated source device, as described above. The source device may be a computing device such as a laptop computing device, hand held computing device, print server or desktop computing device, or a computer peripheral such as a projector, scanner, printer, facsimile machine, etc. It will be appreciated, however, that the first physical environment need not necessarily physically include the source device.

At 204, the method may include adjusting the printing device to a mode of operation that is useful for interaction with the associated source device. Adjusting to the mode of operation may include configuring the printing device to receive print jobs from the source device, configuring the printing device to interact with the source device via a computer network, and/or configuring the printing device to send data to a destination device. Adjusting to the mode of operation may also include configuring the printing device to identify a source device in the same physical environment as the printing device, and to receive print jobs from such source device. Alternatively, or additionally, adjusting to the mode of operation may include configuring the printing device to identify a destination device in the same physical environment as the printing device, and to send data to such destination device.

At 206, the method may include establishing a communication link between the printing device and the source device, and communicating over the link according to the adjusted mode of operation. The communication may include sending print jobs, scan jobs, faxes, etc. to and from the printing device.

Figure 5:
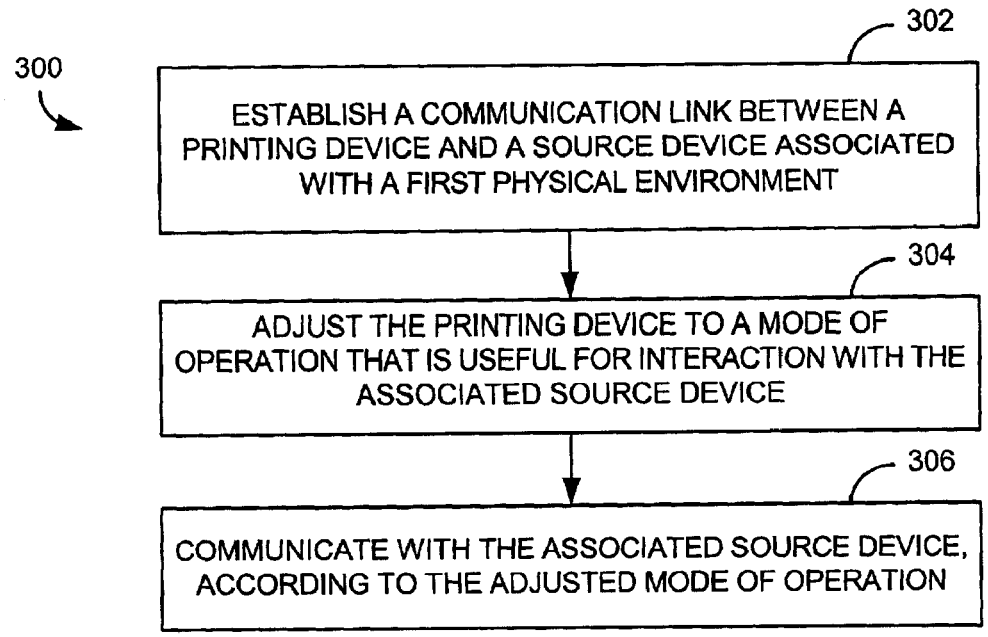
FIG. 5 is a flowchart of a method for use in configuring a printing device according to another embodiment of the present invention.

In FIG. 5, an alternative method of configuring a printing device is shown generally at 300. Method 300 typically begins, at 302, with establishing a communication link between the printing device and the source device, the link itself being sufficient to detect that the printing device is within a predefined physical environment. As indicated previously, such communication link may occur via radio frequency signal, optical signal, hardwire connection, etc. As also indicated previously, the source device may be a source computing device such as a laptop computing device, hand held computing device, print server or desktop computing device, or may be a source computer peripheral such as a projector, scanner, printer, facsimile machine, etc.

At 304, the method includes adjusting the printing device to a mode of operation that is useful for interaction with the associated source device. This adjustment may include, for example, configuring the printing device to receive print jobs from the source device, configuring the printing device to interact with the source device via a computer network, or configuring the printing device to send data to a destination device. Adjusting to the mode of operation may also include configuring the printing device to identify whether the source device is in the same physical environment as the printing device, and to receive print jobs from such a source device. Alternatively, or additionally, the mode of operation may also include configuring the printing device to identify a destination device in the same physical environment as the printing device, and to send data to such destination device.

At 306, the method includes communicating with associated source device according to the adjusted mode of operation. Such communication may include sending print jobs, scan jobs, faxes, etc. to and from the printing device.

The above described embodiments of the present invention enable a user to enter an unfamiliar environment with a printing device, and easily print a document from a source device within the environment, or send a document to a destination device within the environment, without the complicated and lengthy manual reconfiguration required by prior technologies, thereby reducing inconvenience and frustration to the user.

INDUSTRIAL APPLICABILITY

The embodiments of the present invention are applicable to printing devices, and in particular to printing devices that may be moved from location to location.

While the invention has been particularly shown and described with reference to the foregoing preferred embodiments, those skilled in the art will understand that many variations may be made therein without departing from the spirit and scope of the invention as defined in the following claims. The description of the invention should be understood to include all novel and non-obvious combinations of elements described herein, and claims may be presented in this or a later application to any novel and non-obvious combination of these elements. Where the claims recite "a" or "a first" element or the equivalent thereof, such claims should be understood to include incorporation of one or more such elements, neither requiring nor excluding two or more such elements.

I claim:

1. A printing device, comprising:
   a controller configured to determine whether a position of the printing device is within a first physical environment, and upon such determination, to adjust to a mode of operation useful in interacting with a source device associated with the first physical environment; and
   an optical interface configured to establish a wireless communication link between the printing device and the source device, and to interact with the source device via the communication link utilizing the adjusted mode of operation.

2. The printing device of claim 1, wherein the optical interface is configured to initiate establishing the wireless communication link prior to the controller adjusting the mode of operation; and
   wherein the controller is configured to determine whether a position of the printing device is within the first physical environment at least in part by detecting establishment of the wireless communication link with a source device within the first physical environment.

3. The printing device of claim 1, further comprising a position sensor configured to detect position of the printing device.

4. The printing device of claim 3, wherein the position sensor is an optical sensor configured to receive signals from one or more of an optical position beacon, a radio frequency position beacon, and a global positioning satellite position beacon.

5. The printing device of claim 1, wherein the source device is a computing device.

6. The printing device of claim 5, wherein the computing device is selected from the group consisting of a laptop computing device, hand held computing device, print server, and desktop computing device.

7. A printing device, comprising:
   a controller configured to determine whether a position of the printing device is within a first physical environment, and upon such determination, to adjust to a mode of operation useful in interacting with a computer peripheral associated with the first physical environment; and
   a communication interface configured to establish a communication link between the printing device and the computer peripheral, and to interact with the computer peripheral via the communication link utilizing the adjusted mode of operation.

8. The printing device of claim 7, wherein the computer peripheral is selected from the group consisting of projector, scanner, and printer.

9. The printing device of claim 7, wherein the controller is configured to adjust the mode of operation of the printing device at least in part by configuring the printing device to receive print jobs from the computer peripheral.

10. The printing device of claim 7, wherein the communication interface is configured to communicate with the computer peripheral through a computer network, and wherein the controller is configured to adjust the mode of operation of the printing device at least in part by configuring the printing device to interact with the network.

11. The printing device of claim 7, wherein the controller is configured to adjust the mode of operation of the printing device at least in part by configuring the printing device to send data to a destination device.

12. The printing device of claim 11, wherein the computer peripheral is the destination device.

13. The printing device of claim 11, further comprising a scanner configured to collect scan data, wherein the controller is configured to adjust the mode of operation of the printing device at least in part by sending the scan data to the destination device.

14. A printing system, comprising:
   a source device having an associated first physical environment; and
   a printing device configured to determine whether the printing device is positioned within the first physical environment associated with the source device, to adjust the printing device to a mode of operation that is useful in interacting with the source device, and to establish a communication link with the source device, according to the adjusted mode of operation;
   wherein the source device is a projector, and wherein the printing device is configured to adjust to the mode of operation at least in part by configuring the printing device to print documents displayed via the projector.

15. A printing system, comprising:
   a source device having an associated first physical environment; and
   a printing device configured to determine whether the printing device is positioned within the first physical environment associated with the source device, to adjust the printing device to a mode of operation that is useful in interacting with the source device, and to establish a communication link with the source device, according to the adjusted mode of operation, wherein the printing device is configured to adjust to the mode of operation at least in part by configuring the printing device to send and/or receive faxes via the source device.

16. A printing system, comprising:
   a source device having an associated first physical environment; and
   a printing device configured to determine whether the printing device is positioned within the first physical environment associated with the source device, to adjust the printing device to a mode of operation that is useful in interacting with the source device, and to establish a communication link with the source device, according to the adjusted mode of operation;
   wherein the source device includes a source scanner, and wherein the printing device is configured to adjust to the mode of operation at least in part by configuring the printing device to print scans from the source scanner.

17. A printing system, comprising:
   a source device having an associated first physical environment; and
   a printing device configured to determine whether the printing device is positioned within the first physical environment associated with the source device, to adjust the printing device to a mode of operation that is useful in interacting with the source device, and to establish a communication link with the source device, according to the adjusted mode of operation;

wherein the printing device includes an onboard scanner, and wherein the printing device is configured to adjust to the mode of operation at least in part by configuring the printing device to send scan data from the onboard scanner to a destination device associated with the first physical environment.

18. A method for use in configuring a printing device, the method comprising:

detecting that the printing device is within a first physical environment, wherein detecting that the printing device is within the first physical environment includes detecting an optical signal, the first physical environment having an associated source device;

adjusting the printing device to a mode of operation that is useful for interaction with the associated source device; and establishing a communication link between the printing device and the associated source device.

19. The method of claim 18, wherein adjusting to the mode of operation includes configuring the printing device to receive print jobs from the associated source device.

20. The method of claim 18, wherein adjusting to the mode of operation includes configuring the printing device to interact with the associated source device via a computer network.

21. The method of claim 18, wherein adjusting to the mode of operation includes configuring the printing device to send data to a destination device associated with the first physical environment.

22. The method of claim 18, wherein adjusting to the mode of operation includes configuring the printing device to identify whether the associated source device is in the same physical environment as the printing device, and if so, to configure the printing device to receive print jobs from the associated source device.

23. The method of claim 18, wherein adjusting to the mode of operation includes configuring the printing device to detect whether a destination device is in the same physical environment as the printing device, and if so, to configure the printing device to send data to the destination device.

24. The method of claim 18, wherein detecting that the printing device is within the first physical environment includes detecting a signal from a position beacon.

* * * * *